Figure 1:
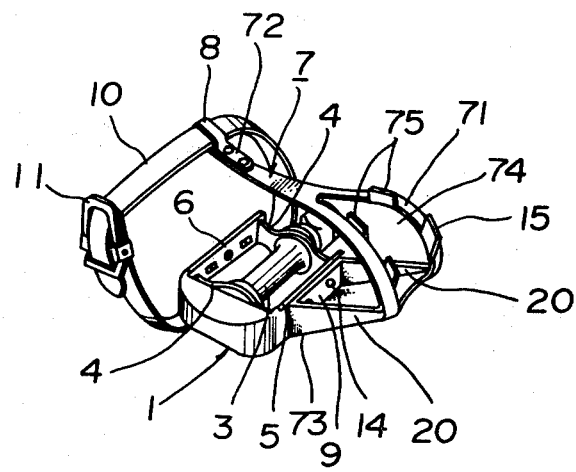

United States Patent [19]
Okajima

[11] 4,269,084
[45] May 26, 1981

[54] TOE CLIP FOR A BICYCLE PEDAL

[75] Inventor: Shinpei Okajima, Sakai, Japan

[73] Assignee: Shimano Industrial Company, Limited, Osaka, Japan

[21] Appl. No.: 65,448

[22] Filed: Aug. 10, 1979

[30] Foreign Application Priority Data

Aug. 11, 1978 [JP] Japan ............................ 53-110685[U]

[51] Int. Cl.³ .............................................. G05G 1/16
[52] U.S. Cl. .................................................. 74/594.6
[58] Field of Search ............... 280/291, 294; 74/594.6, 74/594.4

[56] References Cited

U.S. PATENT DOCUMENTS 4,172,392  10/1979  Foster .............................. 74/594.6 X

FOREIGN PATENT DOCUMENTS 2551935  5/1976  Fed. Rep. of Germany .......... 74/594.6
1011821  6/1952  France .................................... 74/594.6
1011888  7/1952  France .................................... 74/594.6

*Primary Examiner*—John J. Love
*Assistant Examiner*—Norman L. Stack
*Attorney, Agent, or Firm*—Stevens, Davis, Miller & Mosher

[57] ABSTRACT

A toe clip is attached to a bicycle pedal and holds a driver's foot thereon in cooperation with a toe strap. The toe clip body is formed of a plate curved forward at a substantially intermediate portion thereof and has the curved portion and a first and second free end portions extending rearwardly thereof. At both side edges of the clip body between the lower end of curved portion and the rear edge of second free end portion are provided a pair of rising pieces approximately equal in height to a front plate at the pedal so that when attached to the pedal for use, the toe clip has a reduced resistance against air flow.

3 Claims, 2 Drawing Figures

U.S. Patent May 26, 1981 4,269,084

TOE CLIP FOR A BICYCLE PEDAL

This invention relates to a toe clip attached to each pedal used mainly for a racing bicycle.

Generally, the racing bicycle has pedals each provided with a toe clip and toe strap. A driver fixes his foot (shoe) onto the pedal by way of the toe clip and toe strap so that he can rotate the bicycle wheel when raising the pedal as well as treading it.

The running resistance of a racing bicycle has an important effect on its running speed and, accordingly, the former should be reduced as much as possible in order to increase the running speed. A conventional toe clip, however, is not very effective in reducing the running resistance and has the defect that an inverted L-like shaped mounting portion for fixing therethrough the toe clip to the tread plate of pedal is breakable.

The present invention has been designed to overcome these defects. A main object of the invention is to provide a toe clip which, when attached to the bicycle pedal, has a reduced resistance against air flow during the bicycle's running. Another object is to provide a toe clip having improved strength.

The invention is characterized in that the toe clip, which is attached to the bicycle pedal to hold thereon a driver's foot in cooperation with a toe strap, is so constructed that the clip body is formed of an elongate plate which is curved forward at is substantially intermediate portion to form the curved portion and a first and second free end portions extending rearwardly thereof, and at both sides of the clip body between the lower end of curved portion and the rear edge of second free end are provided a pair of rising pieces approximately equal in height to a front plate at the pedal, so that when attached to the pedal for use, the toe clip may have a reduced resistance against air flow.

The second free end portion is sloped downwardly and forms at the utmost edge thereof a mounting piece rising upright and extending throughout the width of the same. The rising pieces are provided upright at both side edges of the clip body from the lower end of the curved portion to the utmost edge of the second end portion. Hence, the toe clip of the invention, when attached to the bicycle pedal through the mounting piece, has a reduced resistance against air flow while the bicycle is running. Furthermore, connection of the mounting piece with the rising pieces improves the strength of toe clip.

Figure 2:
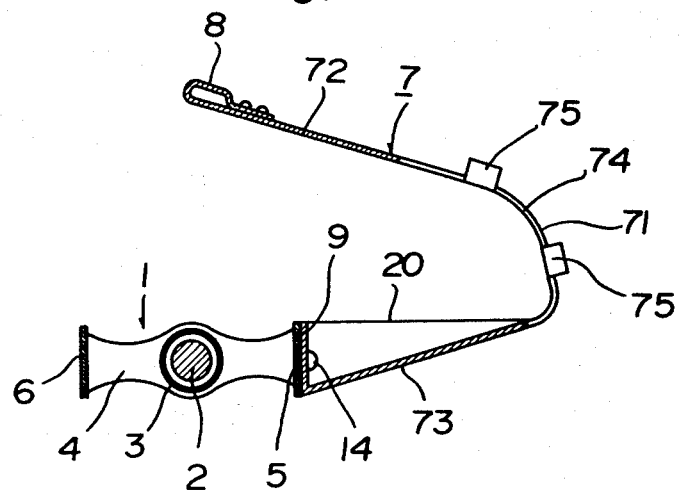

These and other objects and novel features of the invention will be more apparent from the description of an embodiment thereof in accordance with the accompanying drawings, in which:

FIG. 1 is a general perspective view of a toe clip of the invention, which is attached to the bicycle pedal, and FIG. 2 is an enlarged sectional side view thereof.

Referring to the drawings, reference numeral 1 designates a bicycle pedal to which a toe clip of the invention is attached. The pedal 1, as well-known, comprises a center tube 3 rotatably supported to a pedal spindle 2, a pair of side plates 4 fixed to both axial ends of the center tube 3, and a front plate 5 and rear plate 6 fixed to the side plates 4 at both lengthwise ends thereof respectively. The pedal 1 is fixed to a crank arm of the bicycle by screw means or the like through the pedal spindle 2.

The toe clip of the invention is fixed to the front plate 5 at the pedal 1 by fixing means, such as screws 14, and is used to hold in cooperation with a toe strap 10 a drivers foot (shoe) placed onto both the front and rear plates 5 and 6. The toe clip comprises a clip body 7, a holder 8 for the toe strap 10, a mounting piece 9 to be attached to the front plate 5 at the pedal 1, and a pair of rising pieces 20. The clip body 7, as shown in FIG. 2, is formed of an elongate plate which is curved forward at a substantially intermediate portion thereof to form the curved portion 71 and a first and second free end portions 72 and 73 extending rearwardly thereof. The first free end portion 72 is the smallest in width. The second free end portion 73 becomes relatively larger in width and contains a triangular window 74 at its center as shown in FIG. 1, thereby making the toe clip light in weight.

The first free end portion 72 is bent and pinned up at the fore end thereof to form the holder 8 for the toe strap 10. The second free end portion 73, as shown in FIG. 2, is sloped downwardly, and bent upright at the utmost end to form the mounting piece 9 extending throughout the width of second end portion. The pair of rising pieces 20 are provided along both side edges of the clip body 7 between the lower end of curved portion 71 and the utmost edge of second free end portion 73. The mounting piece 9 is made equal in height to the height of the front plate 5. The rising pieces 20 are each triangular looking from the lateral side and have a maximum height approximately equal to that of mounting piece 9, whereby the second free end portion 73 is formed in an upwardly opening box-like shape.

The toe clip constructed as described above is fixed through the mounting piece 9 to the front plate 5 at the pedal 1 by fixing means, such as/screws 14. When the driver puts his foot onto the pedal 1 across the front and rear plates 5 and 6 and the fixes it by the toe clip together with the toe strap 10 to thereby pedal the bicycle, the provision of rising pieces at both side edges of clip body between the lower end of curved portion 71 and the rearmost edge of second free end portion 73 reduces the resistance against air flow in comparison with the conventional pedal, because during the bicycle's running air flows against the clip body 7 and diverges upwardly rearwardly thereof along the upper surface of driver's foot, downwardly rearwardly along the bottom of clip body 7, and sidewards rearwardly along both the rising pieces 20.

The, the driver's foot is fixed to the pedal 1 by the toe strap 10 which is held to the side plates 4 at the pedal 1 and is inserted into the holder 8 at the clip body 7. The driver's foot is placed onto the front and rear plates 5 and 6 and fit to the curved portion 71 at the clip body 7, and then the toe strap 10 is tightened by use of a buckle 11.

In the above described constitution, the mounting piece 9 fixes therethrough the clip body 7 to the front plate 5 at the pedal 1, but instead of the mounting piece 9, the rising pieces 20 may be extended farther from the rear edge of second free end portion 73, the extensions being fixed to both side plates 4 at the pedal 1. Or, the extensions may be bent in L-like shape to be fixed to the front plate 5 in the same manner as mounting piece 9.

Although the mounting piece need not be provided in continuation of the rising pieces 20, but when they are connected they form a box-like shape, providing a toe clip with improved durability with no deformation during use.

At the opposite side edges of window 74 at the curved portion 71 of clip body 7 are provided a plurality of small plates 75 as shown, the plates 75 being mounted upright and serving to rectify air flow. Hence, the air flow diverged upwardly of the clip body 7 is rectified by each plate 75 to thereby prevent the creation of turbulent air flow in the vicinity of the windows 74, thus eliminating resistance against turbulent air flow.

As clearly understood from the aforesaid description, the toe clip of the invention is provided with the pair of rising pieces at both side edges of the second free end portion through which the clip body is attached to the pedal, so that during the bicycle's running the resistance against air flow applied to the pedal is remarkably reduced and also the rising pieces serve as reinforce ribs to improve the strength of the mounting portion of toe clip to the pedal.

Furthermore, the clip body is provided with airflow rectifying plates which prevent the turbulent air flow and reduce resistance thereagainst. The above reduced resistances lead to an increased speed during the bicycle's running.

While an embodiment of the invention has been shown and described, the invention is not limited thereto as many modifications can be made without departing from the spirit and scope of the invention which is defined solely by the following claims.

What is claimed:

1. A toe clip for attachment to a bicycle pedal having a front and a rear plate for holding, in cooperation with a toe strap, a driver's foot onto said pedal, said toe clip comprising:

a clip body formed of an elongate plate curved forward at its substantially intermediate portion to form a curved portion having upper and lower ends and a first and second free end portion respectively extending rearwardly from the upper and lower ends of said curved portion, said second free end portion sloping downwardly to the rearmost end of said clip body, said rearmost end of said second free end portion at its lowest level terminating at the lowest level of said pedal front plate, said clip body being provided at both side edges thereof between the lower end of said curved portion and the rearmost edge of said second free end portion with a pair of rising sidewall pieces which are triangular in shape, each of said rising sidewall pieces having an upper surface which terminates substantially at the level of upper surfaces of said front and rear plates of said pedal and being in horizontal continuation of the level of said upper surfaces so that, when said clip body is mounted on said pedal, said second free end covers the front surface of said front plate of said pedal so as to introduce air flow rearwardly without striking against the front surface of said front plate, thereby reducing resistance against air flow; and, a holder provided at said first free end portion of said clip body for holding said toe strap;

said toe clip, when attached to a bicycle pedal, providing a reduced resistance against air flow.

2. A toe clip according to claim 1, wherein said clip body is gradually reduced in width from said second free end portion toward said first free end portion, and said curved portion is provided with a substantially triangular window, said window being provided at its side edges with a plurality of air-flow rectifying plates extending upwardly.

3. A toe clip according to claim 1, wherein said clip body is provided at the rearmost edge of said second free end portion with a mounting piece which rises upwardly throughout the width of said second free end portion and which is attachable to said pedal, said mounting piece and said pair of rising sidewall pieces, forming a box-like shape for said second free end portion.

* * * * *